United States Patent
Yang et al.

(10) Patent No.: US 9,310,899 B2
(45) Date of Patent: Apr. 12, 2016

(54) STYLUS HAVING HEAD BEING RIGID BODY AND ELECTRONIC DEVICE USING THE SAME

(71) Applicant: HTC Corporation, Taoyuan County (TW)

(72) Inventors: Tun-Chun Yang, Taoyuan County (TW); Chih-Jen Hu, Taoyuan County (TW)

(73) Assignee: HTC Corporation, Taoyuan (TW)

( * ) Notice: Subject to any disclaimer, the term of this patent is extended or adjusted under 35 U.S.C. 154(b) by 45 days.

(21) Appl. No.: 14/262,816

(22) Filed: Apr. 28, 2014

(65) Prior Publication Data

US 2015/0309596 A1 Oct. 29, 2015

(51) Int. Cl.
*G06F 3/0354* (2013.01)

(52) U.S. Cl.
CPC .................. *G06F 3/03545* (2013.01)

(58) Field of Classification Search
CPC ...... G06F 3/03545; G06F 3/044; G06F 3/046
USPC ........................................ 345/179
See application file for complete search history.

(56) References Cited

U.S. PATENT DOCUMENTS

| 5,914,708 A | 6/1999 | LaGrange et al. | |
| 9,052,756 B2 * | 6/2015 | Yeh | B43K 8/003 |

| 2012/0043142 A1 * | 2/2012 | Grivna | 178/19.03 |
| 2012/0206360 A1 * | 8/2012 | Tuan et al. | 345/166 |
| 2012/0223917 A1 * | 9/2012 | Lin | 345/179 |
| 2013/0106777 A1 | 5/2013 | Yilmaz et al. | |

FOREIGN PATENT DOCUMENTS

| JP | H1031543 | 2/1998 |
| TW | 201216127 | 4/2012 |
| TW | 201310297 | 3/2013 |
| TW | M467942 | 12/2013 |

OTHER PUBLICATIONS

"Office Action of Taiwan Counterpart Application", issued on May 25, 2015, p. 1-p. 5.
"Office Action of Deutsches Counterpart Application," issued on Nov. 18, 2014, p. 1-p. 8.

* cited by examiner

*Primary Examiner* — Larry Sternbane
(74) *Attorney, Agent, or Firm* — Jianq Chyun IP Office

(57) ABSTRACT

A stylus and an electronic device are provided, wherein the electronic device includes a body and a stylus. The body has a capacitive touch panel. The stylus includes a handle, a head, an elastic member and an electret. The handle has a main body and a chamber disposed within the main body. The main body has a holding portion and a first end. The holding portion is electrically connected with the first end. The head is assembled to the first end so as to be capable of sliding into the chamber, and the head is a rigid body. The elastic member is disposed in the chamber and located between chamber walls of the chamber and the head. The electret is assembled to the head and located within the chamber.

14 Claims, 4 Drawing Sheets

STYLUS HAVING HEAD BEING RIGID BODY AND ELECTRONIC DEVICE USING THE SAME

BACKGROUND OF THE DISCLOSURE

1. Field of the Disclosure

The disclosure generally relates to a stylus and an electronic device using the stylus, and more particularly, to a stylus configured to control a capacitive touch panel and an electronic device using this stylus.

2. Description of Related Art

As technology rapidly changes, manufacturers of electronic devices, such as notebook computers, mobile phones or portable multimedia players, all tend to use touch panels as input interfaces of a new generation for replacing traditional keyboards. More specifically, current touch panels may roughly be divided into capacitive touch panels and resistive touch panels. When using a capacitive touch panel as the input interface, a user may perform operations, such as entering text, menu selection or so forth, by merely using a finger.

In general, in a process of using the capacitive touch panel, in order to lower a chance of causing inadvertent contact due to icons on a screen being blocked by the user's finger or to meet the purpose of writing, a stylus may be used therewith. However, a nib of the traditional stylus would substantially subjected to an elastic deformation as it contacts the capacitive touch panel, and could still easily cause inadvertent contact when selecting smaller icons. Moreover, when a force applied to the nib increases, since a contact area thereof becomes larger, small fonts are unable to be written and lengths and widths of the fonts are difficult to be controlled.

SUMMARY OF THE DISCLOSURE

The disclosure is directed to a stylus for facilitating in operating a capacitive touch panel.

The disclosure is also directed to an electronic device using the stylus to operate the capacitive touch panel.

The stylus of the disclosure is configured to control the capacitive touch panel. The stylus includes a handle, a head, an elastic member and an electret. The handle has a main body and a chamber disposed within the main body. The main body has a holding portion and a first end. The holding portion is electrically connected with the first end. The head is assembled to the first end of the main body so as to be capable of sliding into the chamber, wherein the head is a rigid body. The elastic member is disposed in the chamber and located between chamber walls of the chamber and the head. The electret is assembled to the head and located within the chamber.

The electronic device of the disclosure includes a body and a stylus. The body has a capacitive touch panel. The stylus includes a handle, a head, an elastic member and an electret. The handle has a main body and a chamber disposed within the main body. The main body has a holding portion and a first end. The holding portion is electrically connected with the first end. The head is assembled to the first end of the main body so as to be capable of sliding into the chamber, wherein the head is a rigid body. The elastic member is disposed in the chamber and located between chamber walls of the chamber and the head. The electret is assembled to the head and located within the chamber.

In an embodiment of the disclosure, the head is fabricated with a conductive material, and the head is electrically connected with the electret.

In an embodiment of the disclosure, the stylus further includes an insulating material encasing the electret and exposing a surface of the head that faces towards the electret.

In an embodiment of the disclosure, entire outer surface of the handle is conductive.

In an embodiment of the disclosure, the elastic member is a spring, a foam or a combination of the spring and the foam.

In an embodiment of the disclosure, the stylus further includes a cap assembled to the first end of the main body, and the head passes through the cap and is exposed to the outside.

In an embodiment of the disclosure, the cap is conducted with the first end.

In view of the foregoing, the head of the stylus of the disclosure is a rigid body. Therefore, when the head of the stylus contacts the capacitive touch panel, a contact area thereof has no change, and thereby may reduce a chance of having inadvertent contact. Meanwhile, as the handle moves in relative to the head and produces a distance variation with the capacitive touch panel, a capacitance variance is formed between the capacitive touch panel and the handle, and a length and a width of a displaying font may be correspondingly changed according to this capacitance variance. Moreover, since the stylus of the disclosure has the electret, and a sensitivity of the stylus as it touches the capacitive touch panel may be enhanced.

To make the aforementioned and other features and advantages of the disclosure more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF THE EMBODIMENTS

Figure 1:
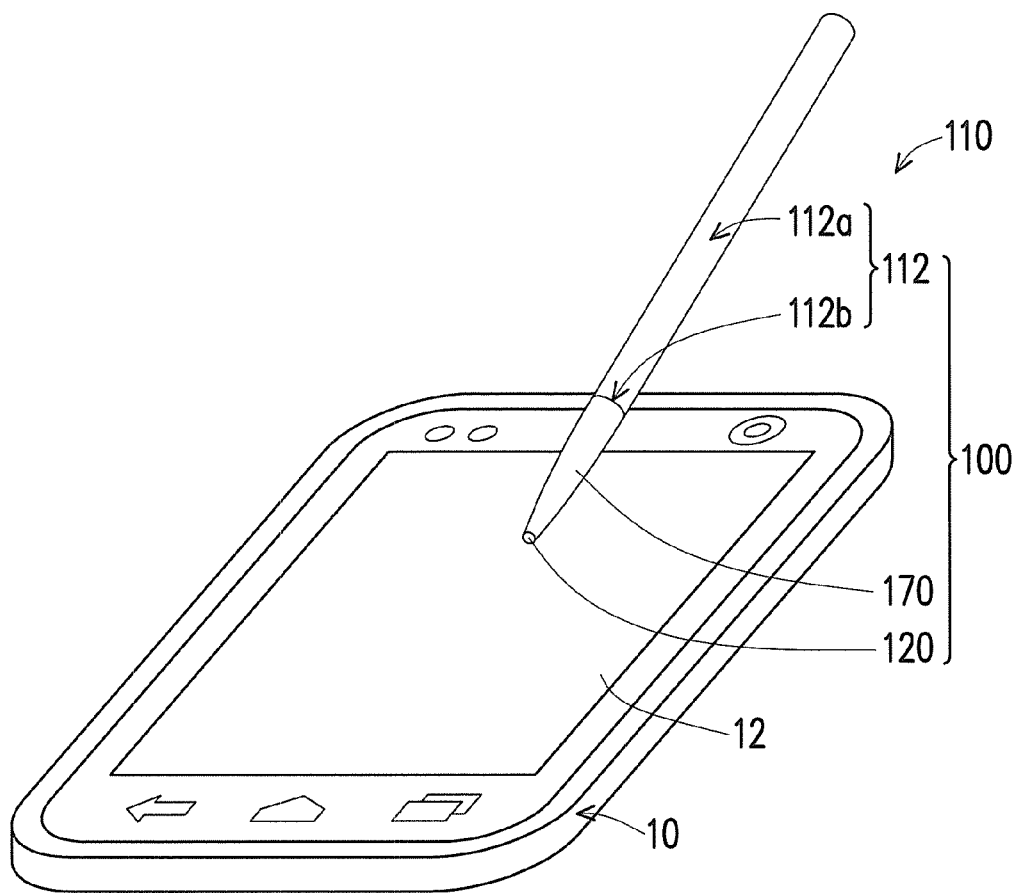
FIG. 1 is a schematic diagram illustrating an electronic device according to an embodiment of the disclosure.

FIG. 1 is a schematic diagram illustrating an electronic device according to an embodiment of the disclosure. In the present embodiment, an electronic device 1 includes a body 10 and a stylus 100. The body 10 of the present embodiment may be an electronic product, such as mobile phone, tablet PC, multimedia player, handheld global positioning system, whereby the body 10 has a touch function by being equipped with a capacitive touch panel 12, and the capacitive touch panel 12 may be controlled through the stylus 100.

Figure 2:
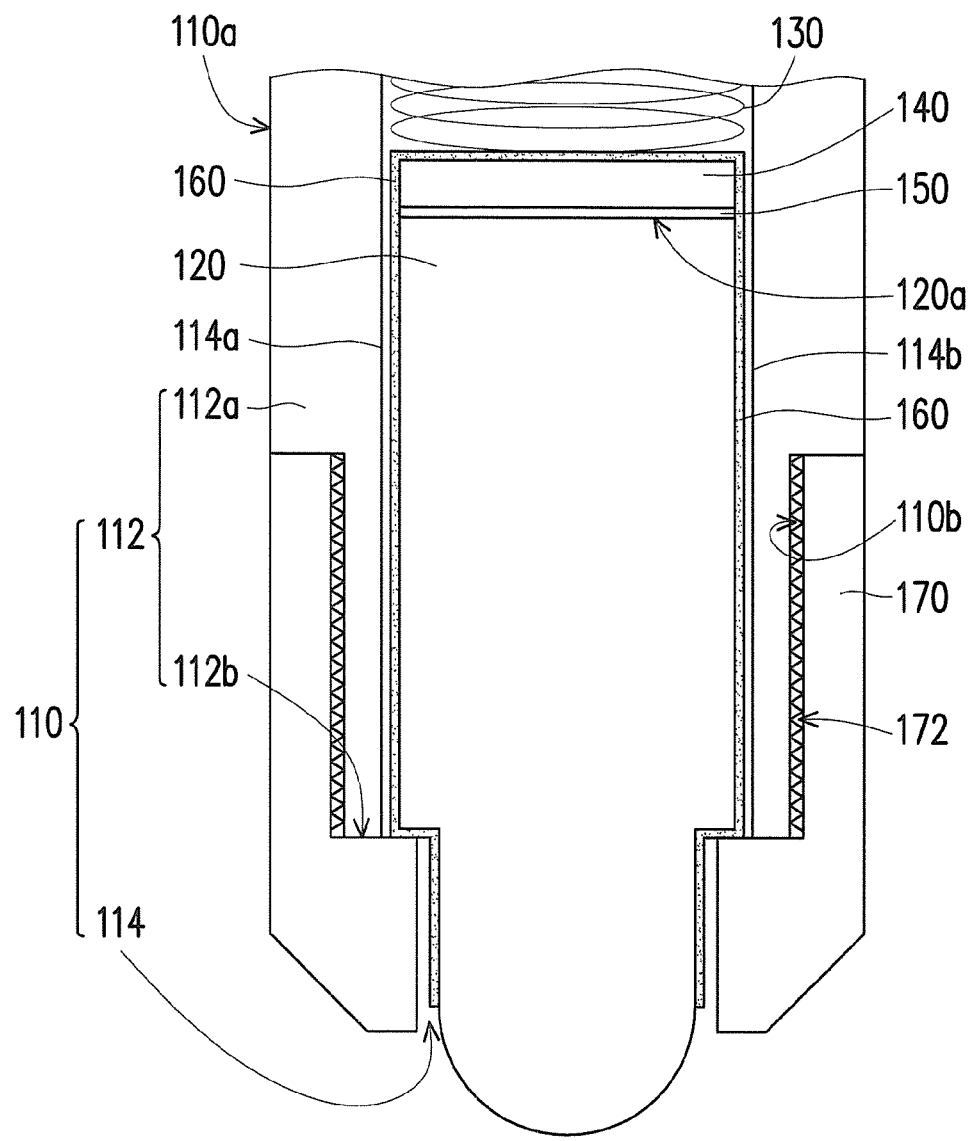
FIG. 2 is a partial cross-sectional diagram illustrating a stylus of FIG. 1.
Figure 3:
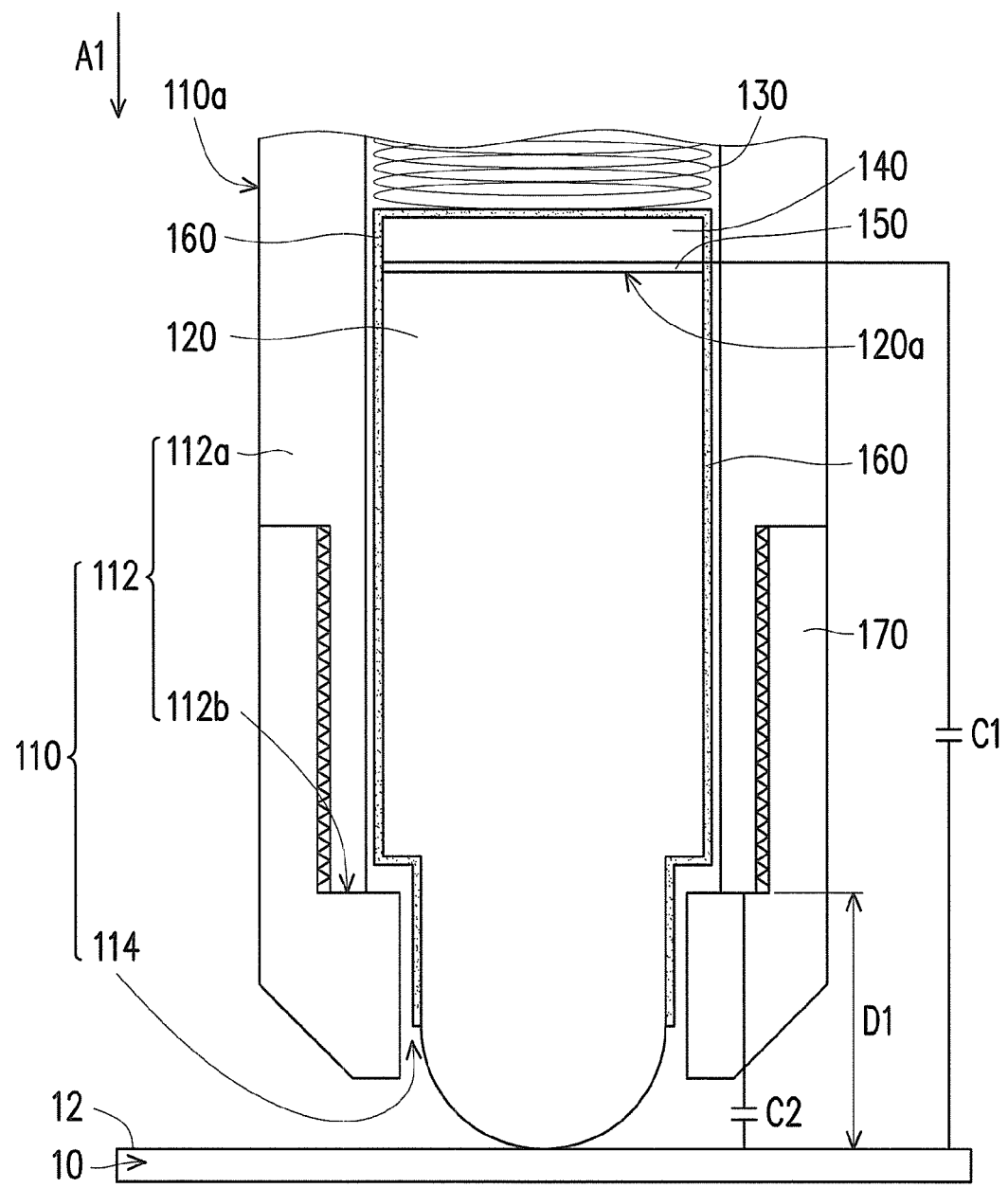
FIG. 3 is a partial cross-sectional diagram illustrating the electronic device of FIG. 1 under a state of being used.
Figure 4:
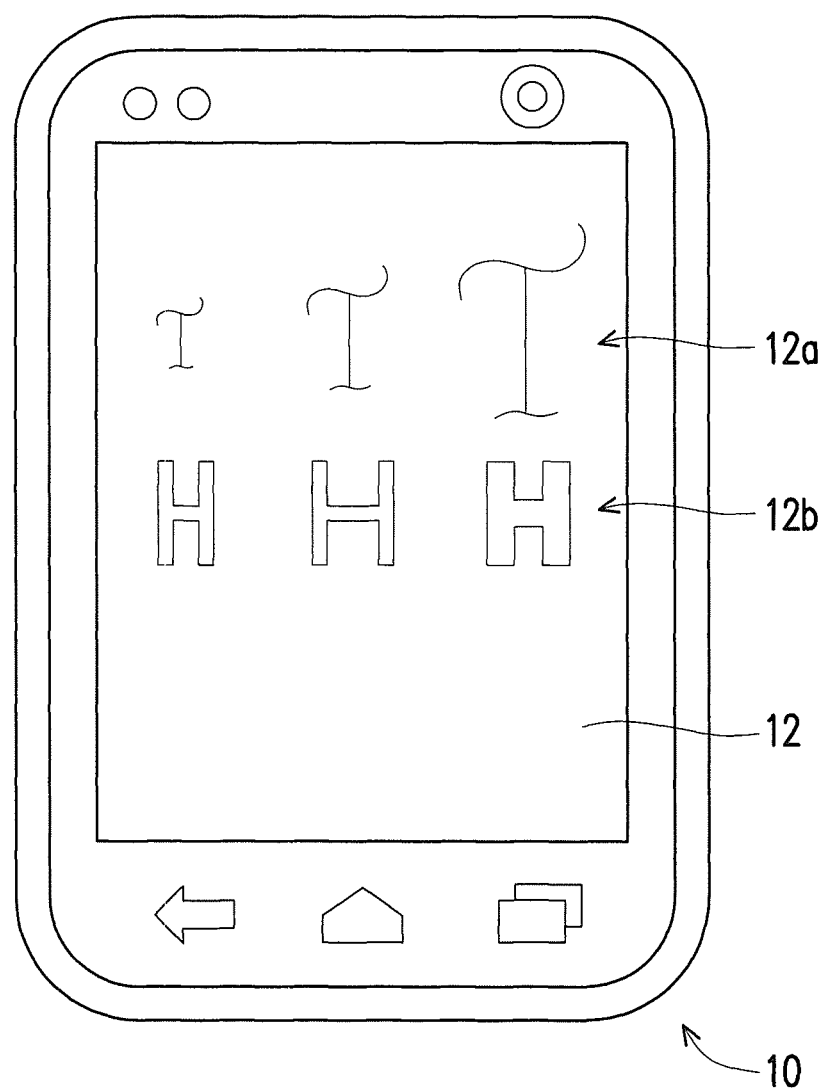
FIG. 4 is a schematic diagram illustrating a body of FIG. 3 according to a variation of second capacitance.

FIG. 2 is a partial cross-sectional diagram illustrating a stylus of FIG. 1. FIG. 3 is a partial cross-sectional diagram illustrating the electronic device of FIG. 1 under a state of being used. FIG. 4 is a schematic diagram illustrating a body of FIG. 3 according to a variation of second capacitance. Referring to FIG. 2 and FIG. 3, the stylus 100 includes a handle 110, a head 120, an elastic member 130 and an electret 140. The handle 110 has a main body 112 and a chamber 114 disposed within the main body 112. The main body 112 has a holding portion 112a and a first end 112b, wherein the holding portion 112a is configured as a portion that enables a user to hold the handle 110. The holding portion 112a is electrically connected with the first end 112b. The head 120 is assembled to the first end 112b of the main body 112 so as to be capable of sliding into the chamber 114, wherein the head 120 is a rigid body. The elastic member 130 is installed in the chamber 114 and located between chamber walls 114a and 114b of the chamber 114 and the head 120. The electret 140 is assembled to the head 120 and located within the chamber 114. The head 120, as being a rigid body, does not deform when touching the capacitive touch panel 12, and thus may be prevented from blocking the user sight and causing inadvertent contact. In addition, since a contact area between the head 120 and the capacitive touch panel 12 has no change, the needs for writing in small font may be fulfilled.

In view of the above, when the user holds the holding portion 112a of the main body 112 to move the head 120 close to the capacitive touch panel 12, given that the electret 140 has a constant charge, an induced current is generated on the capacitive touch panel 12. After the head 120 contacts the capacitive touch panel 12, because an electric potential of the electret 140 is different from an electric potential of the capacitive touch panel 12, a first capacitance C1 is formed between the electret 140 and the capacitive touch panel 12. The capacitive touch panel 12 may sense a location of the head 120 based on a generation position of the first capacitance C1. The configuration of the electret 140 may enhance a sensitivity of the stylus 100 as the stylus 100 touches the capacitive touch panel 12.

At the same time, because an electric potential in a user body is also different from the electric potential of the capacitive touch panel 12, a second capacitance C2 and a relative distance D1 are formed between the first end 112b of the main body 112 and capacitive touch panel 12. When the user holds the handle 110 to move downwards with force, the head 120 compresses the elastic member 130, and the main body 112 moves along a moving direction A1 in relative to the head 120. Therefore, a change in the relative distance D1 causes the second capacitance C2 to have a variance. The capacitive touch panel 12 can sense the variance and sends this variance to the body 10, so as to generate a signal by performing a calculation using hardware, software or firmware. Based on this signal, the capacitive touch panel 12 displays a corresponding stylus trace, such as a font 12a of a different length or a font 12b of a different width, as shown in FIG. 4. Moreover, after the force applied by the head 120 to the capacitive touch panel 12 is removed, the elasticity of the elastic member 130 enables the head 120 to return to an initial position, so as to be prepared for the next writing. As such, the user may control a movement amount (namely, an amount of the relative distance D1) of the head 120 as the head 120 slides into the chamber 114 of the main body 112, so that the second capacitance C2 has a variance, and thereby the corresponding stylus trace (such as a long/short font or a wide/flat font) may be displayed. In addition, since the head 120 is a rigid body and does not deform by an external force, difficulties for writing in small fonts may be overcome.

The head 120 of the present embodiment may be fabricated with metal or other conductive material, and a conductive adhesive 150 is disposed between the head 120 and the electret 140 so as to electrically connect the head 120 with the electret 140. As such, the electric potential of the electret 140 and the electric potential of the head 120 may be considered as a same electric potential, and thus the induced currents of the first capacitance C1 and the capacitive touch panel 12 may be increased, thereby enhancing the sensitivity of the stylus 100 when the stylus 100 touches the capacitive touch panel 12.

Besides, the stylus 100 of the present embodiment further includes an insulating material 160, which may encases the electret 140 and a portion of the head 120, and the insulating material 160 exposes a surface 120a of the electret 140 that faces towards the head 120. With this configuration, the head 120 and the electret 140 may be spaced apart from the chamber walls 114a and 114b of the chamber 114 and be electrically insulated from the handle 110, and the electric potentials of the head 120 and the electret 140 and the electric potential of the handle 110 do not have the same electric potential, so that sensings of the first capacitance C1 and the second capacitance C2 are prevented from being influenced, wherein the insulating material 160 of the present embodiment may be an insulating paint or a cover body made with non-conductive plastic material.

The handle 110 of the present embodiment may completely be fabricated with metal or other conductive material so that an outer surface 110a of the handle 110 is conductive. In another embodiment (not shown), the handle 110 may also be constituted by an insulating body (not shown) and a conductive layer (not shown) covering on a surface of the insulating body. A material of the insulating body is, for example, plastic or other insulating material, and particularly, may be selectively be an insulating material with lower cost. A material of the conductive layer may be metal or other proper conductive material, and the conductive layer may be covered on the surface of the insulating body through using electroplating or other proper means, so that the outer surface of the handle can conduct electricity.

Moreover, the stylus 100 may further include a cap 170 assembled to the first end 112b of the main body 112. In addition, the cap 170 may have a plurality of threads 172, and after the head 120 passes through the cap 170, the threads 172 of the cap 170 are screwed with threads 110b of the handle 110 so that the head 120 is exposed to the outside. Furthermore, in the present embodiment, the cap 170 may be fabricated with metal or other conductive material, and may be conducted with the first end 112b of the main body 112. In other words, when the stylus 100 is equipped with the conductive cap 170, the first end 112b may be considered as being in front of the cap 170. As such, the second capacitance C2 may be increased, thereby enhancing an operation success rate in correspondence to different fonts when using the stylus 100 to write on the capacitive touch panel 12.

The elastic member 130 of the present embodiment may be configured to enable the head 120 to slide into or slide out of the chamber 114 of the handle 110, wherein the elastic member 130 may be a spring, a foam or a combination of the spring and the foam.

In summary, the head of the disclosure as being subjected to the force does not deform, and the contact area between the head and the capacitive touch panel has no change. Therefore, the stylus of the disclosure may reduce the chance of having inadvertent contact due to the user sight being blocked. In addition, by equipping the stylus with the electret, the sensitivity of the stylus when the stylus touches the capacitive touch panel may be enhanced. When writing on the capacitive touch panel with the stylus, the second capacitance has a variance as the relative distance between the first end of the handle and the capacitive touch panel is changed, and this variance may be used as the basis for the change in thickness of the displayed stylus trace. When the head is conductive and electrically connected with the electret, the sensitivity of the stylus when the stylus touches the capacitive touch panel may be enhanced.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims and their equivalents.

What is claimed is:

1. A stylus configured to control a capacitive touch panel, the stylus comprising:
    a handle, having a main body and a chamber disposed within the main body, wherein the main body has a holding portion and a first end, and the holding portion is electrically connected with the first end;
    a head, assembled to the first end of the main body so as to be capable of sliding into the chamber, wherein the head is a rigid body;
    an elastic member, disposed in the chamber and located between chamber walls of the chamber and the head; and
    an electret, assembled to the head and located within the chamber.

2. The stylus as recited in claim 1, wherein the head is fabricated with a conductive material, and the head is electrically connected with the electret.

3. The stylus as recited in claim 2 further comprising an insulating material encasing the electret and exposing a surface of the head that faces towards the electret.

4. The stylus as recited in claim 1, wherein the entire outer surface of the handle is conductive.

5. The stylus as recited in claim 1, wherein the elastic member is a spring, a foam or a combination of the spring and the foam.

6. The stylus as recited in claim 1 further comprising a cap assembled to the first end of the main body, and the head passes through the cap and is exposed to the outside of the cap.

7. The stylus as recited in claim 6, wherein the cap is conducted with the first end.

8. An electronic device, comprising:
    a body, having a capacitive touch panel; and
    a stylus, comprising:
        a handle, having a main body and a chamber disposed within the main body, wherein the main body has a holding portion and a first end, and the holding portion is electrically connected with the first end;
        a head, assembled to the first end of the main body so as to be capable of sliding into the chamber, wherein the head is a rigid body;
        an elastic member, disposed in the chamber and located between chamber walls of the chamber and the head; and
        an electret, assembled to the head and located within the chamber.

9. The electronic device as recited in claim 8, wherein the head is fabricated with a conductive material, and the head is electrically connected with the electret.

10. The electronic device as recited in claim 9, wherein the stylus further comprises an insulating material encasing the electret and exposing a surface of the head that faces towards the electret.

11. The electronic device as recited in claim 8, wherein the entire outer surface of the handle is conductive.

12. The electronic device as recited in claim 8, wherein the elastic member is a spring, a foam or a combination of the spring and the foam.

13. The electronic device as recited in claim 8, wherein the stylus further comprises a cap assembled to the first end of the main body, and the head passes through the cap and is exposed to the outside of the cap.

14. The electronic device as recited in claim 13, wherein the cap is conducted with the first end.

* * * * *